US008559680B2

(12) United States Patent
Schnorr et al.

(10) Patent No.: US 8,559,680 B2
(45) Date of Patent: Oct. 15, 2013

(54) METHOD AND DEVICE FOR COMPUTER-AIDED SEGMENTATION OF AN ENVIRONMENT INTO INDIVIDUAL OBJECTS

(75) Inventors: Claudius Schnorr, Mannheim (DE); Peter Krzystek, Munich (DE); Josef Reitberger, Rinchnach (DE); Volkan Oniz, Birkenhordt (DE)

(73) Assignee: Hochschule Munchen (DE)

( * ) Notice: Subject to any disclaimer, the term of this patent is extended or adjusted under 35 U.S.C. 154(b) by 288 days.

(21) Appl. No.: 12/935,791

(22) PCT Filed: Apr. 2, 2009

(86) PCT No.: PCT/EP2009/053962
§ 371 (c)(1),
(2), (4) Date: Jul. 5, 2011

(87) PCT Pub. No.: WO2009/121934
PCT Pub. Date: Oct. 8, 2009

(65) Prior Publication Data
US 2011/0305372 A1 Dec. 15, 2011

(30) Foreign Application Priority Data
Apr. 3, 2008 (DE) .................. 10 2008 017 149

(51) Int. Cl.
G06K 9/62 (2006.01)
(52) U.S. Cl.
USPC .............................. 382/110; 702/2
(58) Field of Classification Search
None
See application file for complete search history.

(56) References Cited

PUBLICATIONS

Morsdorf, Felix, et al. "Clustering in airborne laser scanning raw data for segmentation of single trees." International Archives of the Photogrammetry, Remote Sensing and Spatial Information Sciences 34.part 3 (2003): W13.*
Reitberger, J., et al. "3D segmentation of full waveform LIDAR data for single tree detection using normalized cut." International Archives of Photogrammetry, Remote Sensing and Spatial Information Sciences 37 (2008): 77-83.*

(Continued)

*Primary Examiner* — Stephen R Koziol
*Assistant Examiner* — Raphael Schwartz
(74) *Attorney, Agent, or Firm* — Jansson Munger McKinley & Shape Ltd.

(57) ABSTRACT

The invention relates to a method for computer-aided segmentation of an environment into individual objects, in particular of a wood into individual trees, in which signals (SIG_R) backscattered by the objects are recorded by measurement technology, wherein the backscattered signals (SIG_R) result from the irradiation of the environment to be segmented with electromagnetic radiation. Furthermore, in the method according to the invention, spatial co-ordinates (x, y, z) of points which cause the backscattering and represent the object parts $(X_1, X_2, \ldots, X_5)$ are determined from the backscattered signals (SIG_R), and a feature vector (f) is assigned to each of the points (P; P1, P2), which feature vector comprises at least the spatial co-ordinates (x, y, z) of the point in question (P; P1, P2). Then a distance measure (d) is determined for each of the feature vectors (f), which represents a similarity between the feature vectors (f) of two points (P; P1, P2). Finally the feature vectors (f) assigned to the points (P; P1, P2) are allocated to disjoint segments (A, B) in such a manner that a cost function (E) which takes into account the distance measures (d) of all the feature vectors (f) to each other is minimized, as a result of which the segmentation of the environment into individual objects is provided.

20 Claims, 4 Drawing Sheets (56) References Cited

PUBLICATIONS

Hyppa, Juha et al., "A Segmentation-Based Method to Retrieve Stem Volume Estimates from 3-D Tree Height Models Produced by Laser Scanners", IEEE Transactions on Geoscience and Remote Sensing, vol. 39, No. 5, May 2001.
Reitberger, J. et al., "Combined tree Segmentation and Stem Detection Using Full Waveform Lidar Data", ISPRS Workshop SilviLaser, Sep. 2007, Helsinki.
"Segmentation by Clustering", Chapter14, pp. 301-328, Unknown date.
Persson, Asa et al., "Detecting and Measuring Individual Trees Using an Airborne Laser Scanner", Photogrammetric Engineering & Remote Sensing, vol. 68, No. 9, pp. 925-932, Sep. 2002.
Wang, Yunsheng et al., "Development of a Procedure for Vertical Structure Analysis and 3D-Single Tree Extraction within Forests Based on Lidar Point Cloud", IAPRS. vol. XXXV, Part 3, 2007.
"Application to Normal Mixtures", Chapter 10.3.4, 2 pages.
Boykov, Yuri et al., "Fast Approximate Energy Minimization via Graph Cuts", IEEE Transactions on Pattern Analysis and Machine Intelligence, vol. 23, No. 11, Nov. 2001.
Wagner, Wolfgang, et al., "Gaussian Decomposition and Calibration of a Novel Small-Footprint Full-Waveform Digitising Airborne Laser Scanner", ISPRS Journal of Photogrammetry & Remote Sensing 60, pp. 100-112, 2006.
Shi, Jianbo et al., "Normalized Cuts and Image Segmentation", IEEE Transactions on Pattern Analysis and Machine Intelligence, 22, pp. 1-52.
BNSDOCID: XP-00254226S, "Lidar", Chapter 8.21, pp. 725-732.
Reitberger, J. et al., "Single Tree Detection in Forest Areas with High-Density Lidar Data", ISPRS Workshop SilviLaser, Sep. 2007, Munich.
Solberg, Svein et al., "Single Tree Segmentation Using Airborne Laser Scanner Data in a Structurally Heterogeneous Spruce Forest", Photogrammetric Engineering & Remote Sensing, vol. 72, No. 12, pp. 1369-1378, Dec. 2006.
Vincent, Luc et al., "Watersheds in Digital Spaces: An Efficient Algorithm Based on Immersion Simulations", IEEE Transactions on Pattern Analysis and Machine Intelligence, vol. 13, No. 6, Jun. 1991.

\* cited by examiner

METHOD AND DEVICE FOR COMPUTER-AIDED SEGMENTATION OF AN ENVIRONMENT INTO INDIVIDUAL OBJECTS

FIELD OF THE INVENTION

The invention relates to a method and a device for computer-aided segmentation into individual objects. The invention in particular relates to a method for computer-aided segmentation of a wood into individual trees.

BACKGROUND OF THE INVENTION

There are various reasons for taking stock of individual objects in an environment. For example, taking stock of a wood is of great interest. For example, the knowledge of the amount of wood present, the composition of the wood of different species of tree, their spatial distribution and their age distribution are of interest from both an economic and an ecological standpoint. The chronological sequence of wood development is likewise significant for clarifying the following issues: How badly has a wood been damaged by a storm? How well has the wood recovered from a storm? Does the wood develop better or worse in the long term if pests are actively controlled or not? How much has a wood regenerated just by trees growing again?

When a wood is segmented into individual trees, a wood inventory is carried out "manually" on a selected test area by inspecting and counting the trees. This procedure is however very time-consuming and not very representative for an entire wood. Methods have therefore been developed with which the recording and evaluation of a wood takes place with flights or aided by satellites. In a possible procedure, the environment to be segmented is recorded passively in the visible or near and middle infra-red wavelength range and evaluated. Furthermore, active methods exist in which the wood is scanned with a laser scanner method. To this end, the wood is irradiated with laser beams. Signals backscattered by the trees are recorded with measurement technology and evaluated.

In the passive area by area recording of the wood with electromagnetic radiation in the visible or in the near and middle infra-red wavelength ranges, the wood surface, that is, the canopy of the wood, is recorded. This is in particular the highest points of the crowns of the trees. In contrast, the interior of the wood, in which smaller trees may be hidden, remains invisible to this method.

The conventional laser scanners which are used for segmenting the wood into individual trees are sometimes also able to scan the interior of the wood to a certain extent. In this case what are known as main pulses of the backscattered signal, which are mostly caused by the floor of the wood and by the canopy, are recorded by measurement technology. In this case, spatial coordinates of backscatter points on the tree crowns are determined from the known direction of the emitted laser beam and the transit time until receipt of the backscattered pulses. For this reason only insufficient information about the interior of the wood can be gained on the basis of such laser scanners.

These shortcomings during recording are also reflected in the subsequent evaluation process. Approaches to segmenting individual trees of a wood generally proceed from the tree canopy recorded by measurement technology. However, as described, points below the tree crowns are not taken into account thereby. Local maximums in the wood surface define the positions of the tree trunks. In Hyyppä, J., Kelle, O., Lehikoinen, M., Inkinen, M., 2001, "A segmentation-based method to retrieve stem volume estimates from 3-D tree height models produced by laser scanners", IEEE Transactions on Geoscience and remote Sensing, 39:969-975, the tree canopy is for example formed from the locally highest measured points. From Solberg, S., Naesset, E., Bollandsas, O. M., 2006, "Single Tree Segmentation Using Airborne Laser Scanner Data in a Structurally Heterogeneous Spruce Forest", Photogrammetric Engineering & Remote Sensing, Vol. 72, No. 12, December 2006, pages 1369-1378, it is known to calculate a three-dimensional area by interpolation from the highest measured points. In order to segment this three-dimensional surface into individual tree crown sections, it is assumed that each tree locally forms the highest point in the tree canopy. It is known from Vincent, L., Soille, P., 1991, "Watersheds in Digital Spaces: An Efficient Algorithm Based on Immersion Simulations", IEEE Transactions of Pattern Analysis and Machine Intelligence, Vol. 13, No. 6, June 1991, pages 583-598 to obtain the tree crown segments as encircling polygons by means of what is known as the watershed algorithm. In contrast, Persson, A., Holmgren, J. and Söderman, U., 2002, "Detecting and measuring individual trees using an airborne laserscanner" Photogrammetric Engineering & Remote Sensing 68(9), pages 925-932 proposes determining the tree crown segments by means of a segmentation which depends on the gradient of the wood surface. A corresponding proposal can also be found in Hyyppä, J., Kelle, 0., Lehikoinen, M., Inkinen, M., 2001, "A segmentation-based method to retrieve stem volume estimates from 3-D tree height models produced by laser scanners", IEEE Transactions on Geoscience and remote Sensing, 39:969-975. The publication Solberg, S., Naesset, E., Bollandsas, O. M., 2006, "Single Tree Segmentation Using Airborne Laser Scanner Data in a Structurally Heterogeneous Spruce Forest", Photogrammetric Engineering & Remote Sensing, Vol. 72, No. 12, December 2006, pages 1369-1378 proposes the use of the region growing approach to obtain the tree crown segments. All the known methods, however, completely omit information below the wood surface, even if information is sometimes present in the backscattered signals. Only a segmentation in two-dimensional form can take place thereby, which does not allow detailed conclusions to be drawn about the wood.

In Wang, Y., Weinacker, H., Koch, B., 2007, "Development of a Procedure for Vertical Structure Analysis and 3D-Single Tree Extraction within Forests Based on Lidar Point Cloud", Proceedings of the ISPRS Workshop Laser Scanning 2007 and SilviLaser 2007, Vol. XXXVI, PART 3/W52, 12-14 Sep. 2007, Espoo, pages 419-423, in order to be able to carry out a three-dimensional segmentation of the wood, the wood region is subdivided into different planes which lie on top of each other. In these two-dimensional planes, tree crown segments are identified by means of morphological operations from image processing. The tree crown segments are then assembled hierarchically. This procedure however only makes it possible to evaluate the three-dimensional information available from the laser signals in an indirect and thus not very consistent manner.

To irradiate a wood which is to be segmented, what are known as full waveform laser scanners are furthermore known, which can record not only the generally most strongly backscattered pulses of the wood surface and of the wood floor, but a complete backscattered chronological signal profile. It is in principle possible to record points of backscattering leaves and branches below the tree crowns as well with these laser scanners. Until now, however, no methods are known with which the data delivered by full waveform laser scanners can be evaluated in such a manner that a three-dimensional segmentation is made possible.

It is therefore the object of the present invention to specify an improved method for computer-aided segmentation of an environment into individual objects which allows three-dimensional analysis of the environment. In particular, a method for computer-aided segmentation of the wood into individual trees is to be specified. A further object of the invention consists in specifying a correspondingly configured device.

While the particular method and a device for computer-aided segmentation into individual objects as herein shown and described in detail is fully capable of attaining the above-described objects of the invention, it is to be understood that these are the presently preferred embodiments of the present invention and are thus representative of the subject matter which is broadly contemplated by the present invention, that the scope of the present invention fully encompasses other embodiments which may become obvious to those skilled in the art.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. Features and advantages of the present invention will become more fully apparent from the following description and appended claims.

SUMMARY OF THE INVENTION

The invention creates a method for computer-aided segmentation of an environment into individual objects. The invention in particular creates a method for computer-aided segmentation of a wood into individual trees. In the method, signals which are backscattered by the objects are recorded by measurement technology, with the backscattered signals resulting from the irradiation of the environment to be segmented with electromagnetic radiation. The electromagnetic radiation can be of a coherent or incoherent nature. The method is preferably based on coherent laser beams. The method can however also be used advantageously with conventional laser scanning data.

Spatial co-ordinates of points which cause the backscattering and represent parts of objects are determined from the backscattered signals, and a feature vector is assigned to each of the points, which vector comprises at least the spatial co-ordinates of the point in question. The object parts can for example be branches, twigs or leaves of a tree. The points which cause the backscattering can be distributed irregularly on an axis which corresponds to the direction of the emitted electromagnetic radiation. In order to simplify the computer processing, the feature vectors which are assigned to each of the points are combined to form a point cloud.

Furthermore, a distance measure is determined for each of the feature vectors, which distance measure represents a similarity between the feature vectors of two points. As the feature vectors comprise at least the spatial co-ordinates of the point in question, in the simplest case for example the Euclidian distance can be calculated as the general distance measure.

Finally the feature vectors assigned to the points are allocated to disjoint segments in such a manner that a cost function which takes into account the distance measures of all the feature vectors to each other is minimized, as a result of which the segmentation of the environment into individual objects is provided.

With the method according to the invention, the shortcomings of the approaches to segmentation of an environment into individual objects described at the start are resolved. In the method according to the invention, the starting point is no longer a detected surface of the environment. Rather, all the information of the backscattered electromagnetic radiation from the entire volume range of the environment is taken into consideration. In contrast to previous evaluations, a real three-dimensional segmentation of the objects can be achieved.

In the concrete case of segmenting a wood into individual trees, a three-dimensional segmentation of the trees can be realized. Furthermore, further properties of the trees can be determined from the backscattered signals. The three-dimensional segmentation takes place by means of a global cost function, which is to be minimized, being convex and can be evaluated rapidly. The proposed method surpasses all previously known methods with respect to accuracy and completeness of the recorded objects. In particular, trees underneath, that is, which are concealed, can for the first time be recognized and registered. This highly accurate three-dimensional tree recognition can for example make possible more accurate evaluations or even tree species recognition using classification approaches.

The electromagnetic radiation is expediently generated by a full waveform laser scanner, with complete recording of a respective full waveform signal which is backscattered by the points taking place, from which signal at least the co-ordinates of a respective point are determined. The use of a full waveform laser scanner allows not only the main pulses to be recorded by measurement technology but also the entire backscattered signal with temporal resolution. Even weaker backscattering which is for example caused by leaves or branches is recorded thereby.

These are recorded by the full waveform signal being decomposed into a series of Gaussian functions in order to determine the backscattered points. The decomposition means that at least one further point-related feature can advantageously be determined for each point from the temporal profile of the energy of the backscattered signal, which feature is added to the allocated feature vector. For example, a pulse width of a Gaussian pulse and its intensity (amplitude) come into consideration as further features. The feature vector accordingly comprises, in addition to the spatial co-ordinates, at least one further point-related feature which is determined from the temporal profile of the energy of the backscattered signal.

The scanning of the environment with electromagnetic radiation which is necessary for three-dimensional segmentation and comprises emitting electromagnetic radiation and/or the recording of the backscattered signals with measurement technology, can take place in an airborne manner with flights, in a satellite-aided manner or terrestrially. The data recorded by measurement technology can be stored for later evaluation or transferred to a processing unit for direct evaluation. In the latter case, an online evaluation is in particular possible, by means of which highly variable or moving objects can be segmented and monitored.

The distance measure is expediently determined by applying a norm to the feature vectors of two points. As long as the feature vectors only comprise the spatial co-ordinates, the Euclidian distance between two feature vectors can for example be determined.

Alternatively, the distance measure is determined by the combination of at least two distance measures which are weighted by means of a respective parameter and differ from each other. The differing distance measures assess similarities or distances in the at least one further point-related feature and spatial distances of the points, in particular in the x and y directions as well as the z direction, differently.

The segmentation of the scanned environment comprises the combination of points or feature vectors from the determined point cloud which belong to the same object. This takes place on the basis of the above-mentioned distance measure for the feature vectors. For the segmentation, a global cost function which takes into account the distances of all the points from each other is introduced and minimized by decomposition into disjoint subsets (segments). In a simple case, the sum of all the distances of the points from each other within the respective segment can be minimized over all the segments as the cost function. In one variant a simple clustering method such as the known k-means method is suitable for the minimization.

Alternatively, a graph-based method is used for minimizing the global cost function, in which a graph consisting of the points as nodes and the distance measures between the points as the edges is formed. The graph-based NCut measure is expediently used, with the cost function being minimized by the normalized cut method.

In a further alternative, a global cost function is formed which is minimized by means of a graph cut method. This corresponds to the maximisation of the flux between two segments to be formed, with the flux representing the sum of all the edges between nodes of the two subgraphs to be defined.

In the course of the segmentation, the number of the resulting segments is defined using one or a plurality of parameters. The segments are in particular further decomposed iteratively into subsegments as far as a termination criterion, as a result of which a high degree of accuracy is achieved during the segmentation with acceptable processing effort.

It is advantageous for visualisation purposes or for merely accelerating the calculations carried out in the course of the method to divide the environment into a predefined spatial grid of voxels and to assign the points in each case to one of the voxels, with points which lie in the same voxel being combined. The combination of a plurality of points in the same voxel can for example take place by averaging the further point-related features. The intensities and pulse widths of the respective points can in particular be averaged.

The method furthermore makes it possible for a measure which is calculated from the point-related features of other points from its local neighborhood to be added as at least one further feature into respective feature vectors for at least some of the points. For example, the local scattering of the pulse intensities of the points can be taken into account. It can for example be taken into account how strong a concentration of points is in the local environment. It can also for example be verified whether the further features (intensity and width of a Gaussian pulse) are distributed uniformly over the volume.

The measure is advantageously determined locally for each point by core-based spatial filtering over all points. It is furthermore possible for known knowledge about the objects to be added as further information to the feature vectors and to be taken into account by means of a further distance measure. This can for example be information about probable locations of vertical tree trunks, if the environment to be segmented is a wood.

The further preferred configurations relate in particular to the segmentation of trees as objects in a wood. According to a preferred configuration of this particular application of the method, positions of tree trunks are determined by defining vertical lines in the set of points.

In a further configuration, one or a plurality of the following evaluations are carried out on the basis of the formed segments and the features of the points contained therein: a count of the trees, their size distribution and local distribution; a classification of the trees into different tree species; a determination of the amount of wood using the number and volume of the tree trunks as a function of the respective tree species. The count of the trees can for example take place by the identification of the tree trunks. The size of a tree can be determined using the numbers of the points within a certain segment. The local distribution of the trees is possible by means of an analysis of the distance between determined tree trunks. The classification of the trees into different tree species can for example be determined by one of the further point-related features, by extrapolating the species of a certain tree type from the pulse width and/or intensity. The determination of the amount of wood using the number of tree trunks and their volume is made possible by the analysis of the determined tree trunks. The detailed, three-dimensional recording of the individual trees and the high recognition rate in the method according to the invention have a positive effect here. This method in particular makes it possible to recognize smaller trees and regeneration beneath large trees, which was practically impossible with conventional methods.

Furthermore, an analysis of the development of a wood can take place using a comparison of a plurality of evaluations at different times. To this end, the results determined with the method according to the invention, which were determined at different times, are compared.

In a further application, trees are distinguished from houses in urban areas by tree recognition. According to a further application, trees in orchards or bushes in agricultural areas are recorded and segmented.

The method according to the invention also makes it possible to segment and monitor rapidly changing or moving objects. Houses in urban areas, hail distribution in clouds for the purpose of predicting storms can in particular be recorded, segmented and evaluated as objects.

The invention also includes a computer program product which can be loaded directly into the internal memory of a digital computer and comprises software code sections with which the steps according to the method of the invention are carried out when the product runs on a computer. A computer program product comprising a computer usable medium having computer usable program code for computer-aided segmentation of an environment into individual objects is provided. The computer program product includes the method steps of the invention as set forth above.

The invention includes a device for carrying out the above-described method. The same advantages are achieved with this as have already been explained above. The device according to the invention comprises a first means for recording signals which are backscattered by the objects by measurement technology, with the backscattered signals resulting from the irradiation of the environment to be segmented with electromagnetic radiation. The device comprises a second means for determining spatial co-ordinates from the backscattered signals of points causing the backscattering, which represent parts of objects, with it being possible to assign a feature vector to each of the points by the second means, which feature vector comprises at least the spatial co-ordinates of the point in question. A third means for determining a distance measure for each of the feature vectors is furthermore provided, which distance measure represents a similarity between the feature vectors of two points. Using a fourth means, the feature vectors assigned to the points can be allocated to disjoint segments in such a manner that a cost function which takes into account the distance measures of all the feature vectors to each other can be minimized, as a result of which the segmentation of the environment into individual objects is provided.

BRIEF DESCRIPTION OF THE DRAWINGS

In order that the advantages of the invention will be readily understood, a more detailed description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
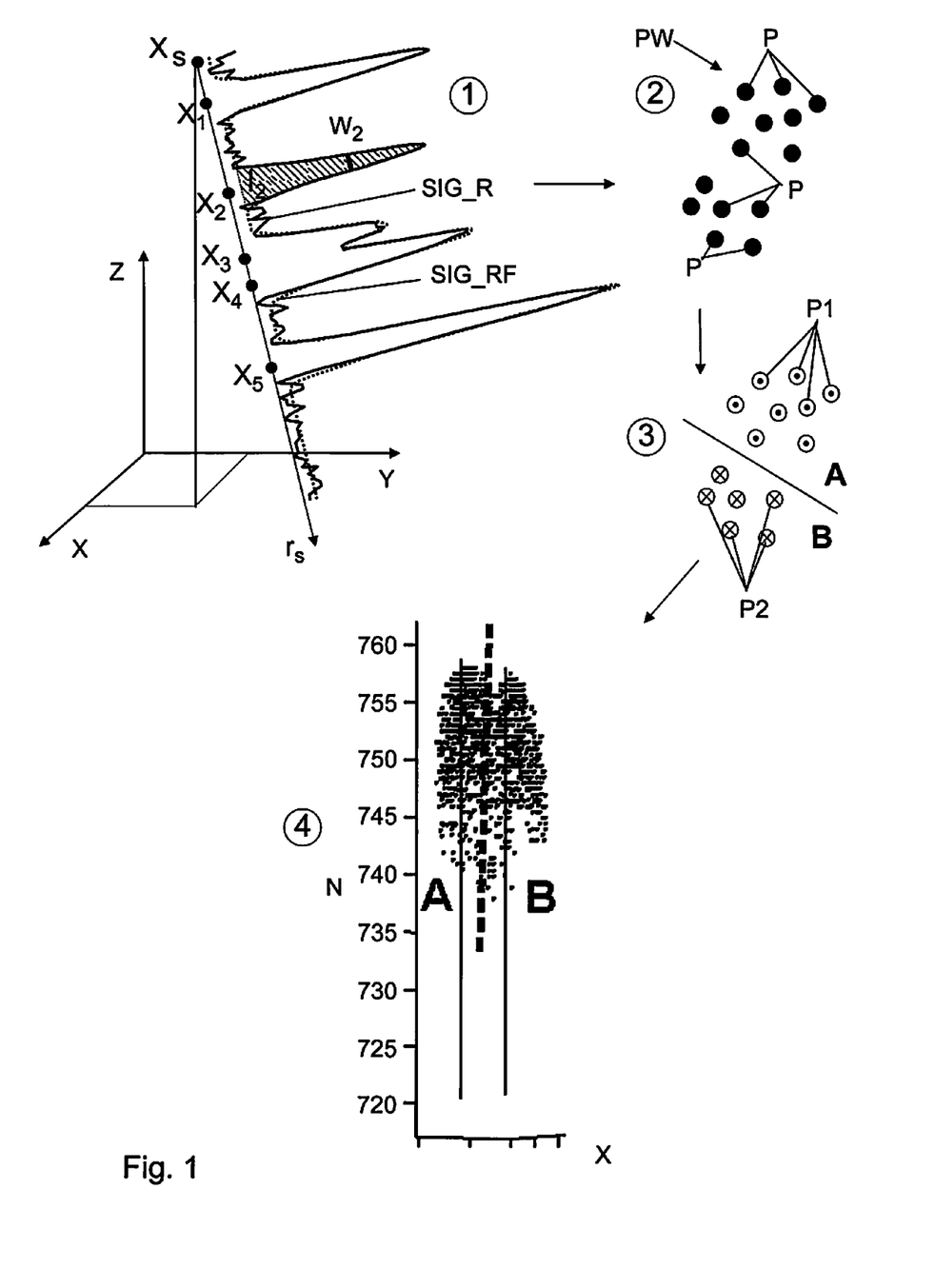
FIG. 1 shows a schematic diagram of the steps of the method according to the invention.

FIG. 1 schematically shows an exemplary embodiment of the method for computer-aided segmentation of an environment into individual objects. In the exemplary embodiments below, additional embodiments of the method are described with reference to a segmentation of a wood into individual trees. The method according to the invention is however not restricted to this specific application, but can be used generally for segmenting an environment into individual objects, for example houses, bushes, hail distribution in clouds and the like.

The method for three-dimensional segmentation of a wood into individual trees emanates from scanning the wood with electromagnetic beams. The electromagnetic radiation can be of a coherent or incoherent nature, with coherent laser beams preferably being used. Scanning can take place in an airborne manner using flights over the area, in a satellite-aided manner or terrestrially. A full waveform laser scanner is preferably used for scanning the wood with electromagnetic radiation. Full waveform laser scanners are able to record not only main pulses but the entire backscattered signal, shown in FIG. 2, with temporal resolution. The diagram in FIG. 2 corresponds to the situation illustrated at "1" in FIG. 1. A laser beam which is emitted by the laser scanner is drawn in by way of example, the radiation direction of which is indicated by $r_s$.

Figure 2:
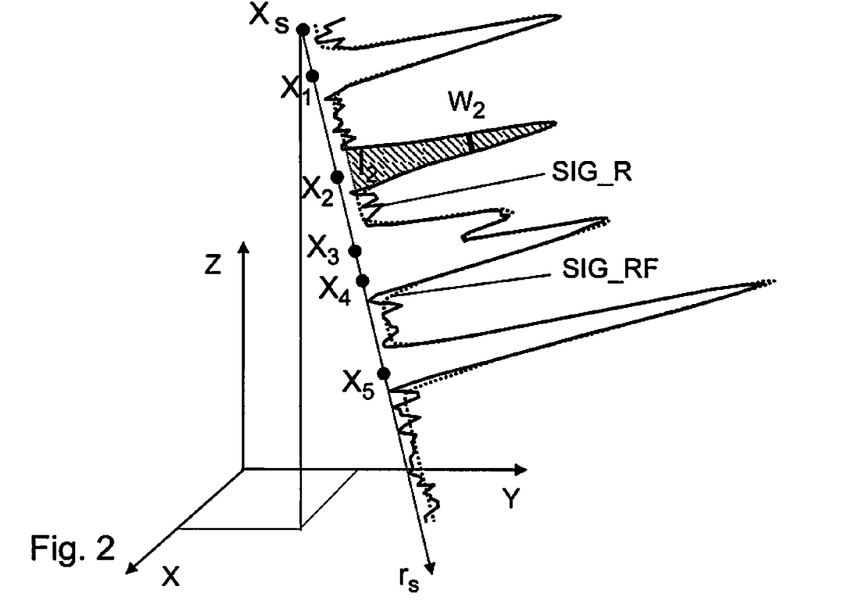
FIG. 2 shows an exemplary backscattered signal with temporal resolution of a laser beam emitted by a laser scanner, with which a three-dimensional segmentation can be carried out.

Spatial coordinates $x_i, y_i, z_i$ of points $X_i$ (i=1, ..., $N_R$), which represent object or tree parts and backscatter the electromagnetic signal, can be defined from the signal transit times and the known radiation direction of the laser scanner. In the exemplary embodiment according to FIG. 1, a total of five such points $X_1, X_2, ..., X_5$ are shown by way of example at "1". These points which represent the tree parts are distributed irregularly on an axis which corresponds to the direction $r_s$ of the radiated laser beam. The radiation at the points $X_1$, $X_2, ..., X_5$ are backscattered in different ways. The backscatter signal is labeled SIG_R and has a different amplitude depending on the type of backscattering. Precisely this, as well as weaker backscattering which is caused for example by leaves or branches, is recorded by the use of a full waveform laser scanner. For example, the point $X_5$ represents the tree crown and thus the highest point of a tree. In contrast, the points $X_1, ..., X_4$ represent branches or leaves of one or a plurality of trees. The point $X_5$ for example represents the ground, because of which a backscattering of particularly great intensity is present. Decomposing the backscattered signal SIG_R into a series of Gaussian functions as basic functions identifies the type of backscattering that is taking place. This signal is labelled in FIG. 1 and FIG. 2 with SIG_RF. The total signal is defined as follows:

$$s(x) = \sum_{i=1}^{N_R} A_i e^{-(x-X_i)^2/2\sigma_i^2}$$

In this case,
s(x): represents the total signal,
$N_R$: represents the number of Gaussian functions, which corresponds to the number of the determined points $X_i$,
$A_i$: represents the amplitude of the i-th Gaussian function,
x: represents any position in the direction $r_s$ of the laser beam,
$X_i$: represents the position of the i-th Gaussian function in the direction $r_s$ of the laser beam, which corresponds to the determined point,
$\sigma_i$: represents the standard deviation of the i-th Gaussian function.

For each of the points $X_i$, the respective spatial co-ordinates $x_i, y_i, z_i$ in the Cartesian co-ordinate system shown schematically at "1" in FIG. 1 and in FIG. 2 are determined with a known reference point, preferably at the bottom of the environment to be recorded. A feature vector is assigned to each of the points $X_i$, which feature vector comprises at least the spatial co-ordinates $x_i, y_i, z_i$ of the point in question. The entirety of all the points determined by the scanning process is labelled as the point cloud PW, which is shown schematically without a co-ordinate system at "2" in FIG. 1. The points which are produced from a multiplicity of laser beams are generally indicated with P.

Further properties of the backscattering points $X_i$ can be defined from the total signal s(x). These are as further features in particular a pulse width $W_i = 2\sigma_i$ and its intensity $I_i = \sqrt{2\pi}\sigma_i A_i$. These further features are indicated schematically using the Gaussian function of the point $X_2$ in FIG. 1 and FIG. 2. This produces feature vectors $f_i$ with corresponding additional information:

$$f_i^T = (x_i, y_i, z_i, W_i, I_i),$$

where i=1, ..., $N_R$.

Figure 3:
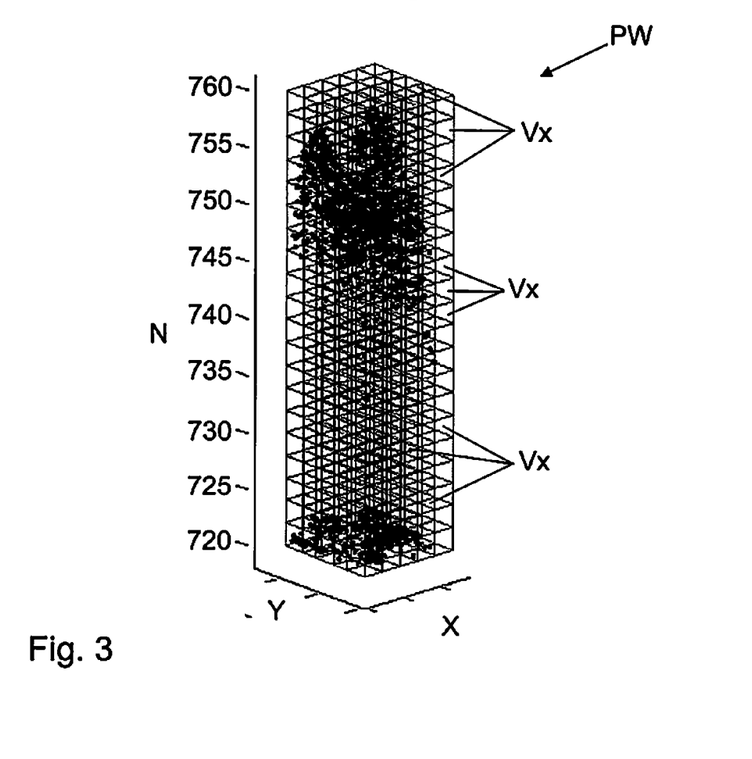
FIG. 3 shows a schematic diagram of the division of a section of a wood volume into a regular grid of volume elements.

In order to make the visualisation of the points determined from a multiplicity of laser beams easier and to accelerate subsequent calculations, it is expedient to divide the space recorded by the laser scanner into a predefined spatial grid of voxels Vx. In this case the points of the point cloud PW are allocated to the respective voxels Vx according to the spatial co-ordinates $x_i, y_i, z_i$. This is shown schematically in FIG. 3. If a plurality of points coincide in one voxel Vx, they are expediently combined. In particular their intensities and pulse widths are averaged in the process.

In a subsequent processing step, a general distance measure is defined:

$$d(i,j) = \|f_i, f_j\|.$$

The general distance measure d(i, j) expresses the similarity between two feature vectors $f_i$ and $f_j$ of two points. If the feature vectors of two points only comprise their spatial co-ordinates, for example the Euclidian distance can be used as the norm for defining the general distance measure according to the following formula:

$$d(i,j)=\sqrt{(x_i-x_j)^2+(y_i-y_j)^2+(z_i-z_j)^2}.$$

In this case it is advantageous to use, in addition to the spatial co-ordinates, corresponding prior knowledge about the typical elongate shape of a tree differently in the used norm, as well as other, point-related features from the feature vectors. This can be realized for example by a combined distance measure:

$$d(i,j)=e^{-(F(i,j)+X(i,j)+Z(i,j)+G(i,j))},$$

where $$F(i,j)=\|f_i-f_j\|^2/\sigma_f^2;$$

$$X(i,j)=d_{ij}^{XY}/\sigma_{XY}^2;$$

$$Z(i,j)=d_{ij}^{Z}/\sigma_Z^2;$$

$$G(i,j)=d_{ij}^{G}/\sigma_G^2.$$

In this case F(i, j) takes into account a distance norm on the basis of the feature vectors, $f_i$, X(i, j) takes into account the spatial distance with respect to the x and y co-ordinates of the points, Z(i, j) takes into account the vertical distance of the points (corresponding to the typical elongate shape of a tree). G(i, j) can be used to take into account further added information. The effects of the various distance measures can be weighted by means of the respective parameters $\sigma_f$, $\sigma_{xy}$, $\sigma_Z$ and $\sigma_G$. G(i, j) makes it possible to consider the points P within the point cloud PW locally. In this case, in particular further features from local environments around the respective points can be taken into account by defining contributions from points from a specific respective neighborhood and adding them to the feature vectors. These can be in particular information about the uniformity of the distribution of the pulse width and intensity over a certain volume range or a measure of the concentration of the points in a selected environment region. It is also possible using σ(i, j) to include in the method according to the invention already known information, such as tree positions, which has been defined with other methods, as prior knowledge.

In a subsequent step, which is indicated schematically with "3" in FIG. 1, the segmentation of the trees takes place. In this method step the points P or their feature vectors from the point cloud PW which belong to each tree are combined. This takes place on the basis of the already determined distance measure for the feature vectors. To this end, a global cost function which takes into account the distances of all the points or feature vectors from each other is introduced. Then the cost function is minimized by decomposing the point cloud PW into disjoint subsets $S_i$=1, ..., c (the segments to be determined).

In a simple case, the cost function can be minimized as the sum of all the distances of the points $x_i$ from each other within the respective segments $S_i$ over all the segments $S_i$:

$$E = \sum_{k=1}^{c} \sum_{i,j|i\neq j, f_i, f_j \in S_K} d(i,j)$$

In this case E indicates the sum of the segment energies. The objective is the minimization of the sum of the segment energies for the defined segments $S_i$.

A simple clustering method such as k-means, as is published for example in Duda, R. O., Hart, P. E., Stork, D. G., 2000, "Pattern Classification", second edition, Wiley&Sons, page 526 is for example suitable for minimizing the global cost function. This clustering method is however of a heuristic nature and can get caught in local minimums of the cost function. This has the consequence that the globally optimum allocation of the points to the defined segments does not necessarily take place. A further disadvantage consists in that the number of the segments c is to be specified.

It is therefore advantageous to apply the costs of the Normalized-Cut as the cost function to the tree segmentation. This method is described for example in Shi, J., Malik, J., 2000, "Normalized cuts and image segmentation", IEEE Transactions on Pattern Analysis and Machine Intelligence, 22, pages 888-905. In this method all the feature vectors are interpreted as elements of the node set V in a graph G={V, E} which is to be drawn. The elements of the edge set E form the distances d(i, j)=$w_{ij}$ of one of the above-defined distance measures. The objective is thus the division of the graph into two disjoint node sets A:=$S_1$ and B:=$S_2$ in such a manner that the similarities between the elements are in each case maximized in the node sets A and B and at the same time the similarities between the elements from different subsets are minimized. The cost function is thus $$NCut(A,B) = \frac{Cut(A,B)}{Assoc(A,V)} + \frac{Cut(A,B)}{Assoc(B,V)},$$

$$\text{where } Cut(A,B) = \sum_{i \in A, j \in B} w_{ij}$$

is the sum of all the weightings between the segments A and B, and $$Assoc(A,V) = \sum_{i \in A, j \in V} w_{ij}$$

is the sum of all the weightings of edges which end in the segment A.

The minimal NCut measure and thus the division of the points into the two subsets A and B is found by the solution of a generalized eigenvalue problem (D−W)y=λDy, where the matrix W is formed by all the weightings $w_{ij}$ and is $$D_i = \sum_j w_{ij}.$$

The solution, that is, the eigenvector y for the second smallest eigenvalue λ, consists after binarization over a threshold of the values {+1,−1}, which indicates the allocation of the feature vectors or the points.

This method optimally minimizes the given cost measure, in contrast to previously mentioned k-means methods, which are however also applicable in principle. A further advantage consists in that the number c of the segments does not have to be explicitly specified, but is given implicitly as a termination criterion on repeated iterative application of the method over a threshold to the NCut measure.

A further advantageous variant for minimizing the global cost function is the use of the graph cut method, which is described in Boykov Y., Veksler O., Zabih R., "Fast Approximate Energy Minimization via Graph Cuts", IEEE Trans. on Pattern Analysis and Machine Intelligence, Vol. 23, No. 11, 2001. The purpose of this method is to find the two subgraphs or segments, with the graph being formed as described above. The method selects the two subgraphs in such a manner that the "flux" between the subgraphs is maximized. The flux is the sum of all the weights of edges which connect the subgraphs. This takes place in a similar manner to traffic capacity calculation tasks for a road network. This method can also be continued iteratively on the subgraphs.

In addition to the already mentioned, supplementary point-related features (pulse width and intensity) from the signal of an individual laser beam, it is advantageous to define further point-related features from local environments around the points and add them to the feature vectors. These further point-related features can be determined from contributions of points from a certain respective neighborhood. In the simplest case, further features can be formed for each point on the basis of the features of other points from a permanently defined environment, such as the scattering of the intensities or the sum of all the intensities. It is also conceivable to define the feature vector components to be selected by means of a core-based filtering process:

$$m(X) = \frac{1}{N_R h} \frac{\sum_{i}^{N_R} m(X_i) K((X - X_i)/h)}{\sum_{i}^{N_R} K((X - X_i)/h)},$$

where K(X) indicates a core function, for example a Gaussian bell curve, and h as the parameter controls the width of the neighborhood to be included. The sum in the denominator over the number of the Gaussian functions is used for normalisation.

It is furthermore advantageous to exploit a priori knowledge about trunk positions of trees. This knowledge can be included in the method according to the invention. To this end, each point is weighted according to the general distance measure determined above, in correspondence with its minimum horizontal distance $d_{ij}^G$ from the closest tree trunk. This means for example, the closer a point lies to a tree trunk, the greater the possibility that the point belongs to a certain segment and thus tree trunk.

Information about positions of tree trunks can for example be obtained according to the methods described in Reitberger, J., Krzystek, P., Stilla, U., "Combined Tree Segmentation and Stem Detection using Full Waveform LIDAR Data", ISPRS Workshop "SilviLaser", September 2007, Helsinki; and Reitberger, J., Heurich, M., Krzystek, P., Stilla, U., "Single Tree Detection in Forest Areas with High-Density LIDAR Data", ISPRS Workshop "Photogrammetric Image Analysis", September 2007, Munich by defining vertical lines in the point cloud and used in the method according to the invention.

The segmentation of the points P of the point cloud PW is shown schematically in FIG. 1 at "3". Here, the points P have been divided into the points P1 of a segment A and points P2 of a segment B. The result of the segmentation is schematically illustrated at "4".

Figure 4A:
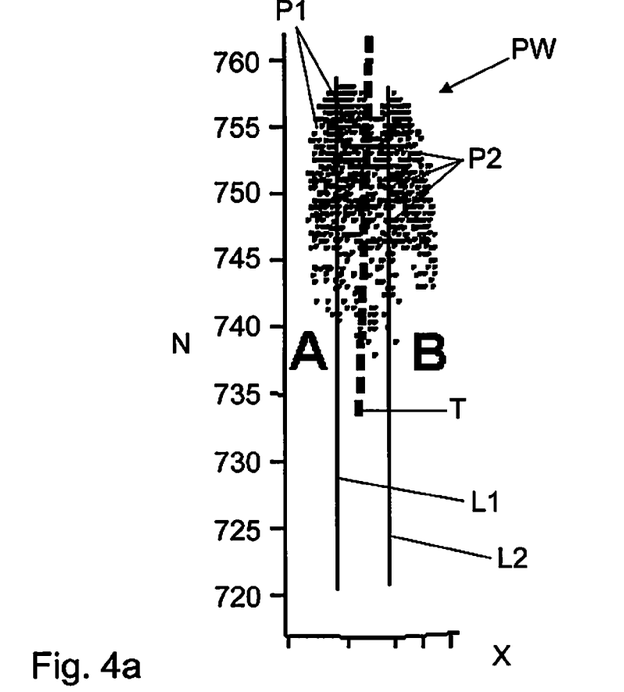
FIGS. 4a to 4c show exemplary embodiments of resulting segmentations of trees by three-dimensional division of a point cloud determined in a computer-aided manner.
Figure 4B:
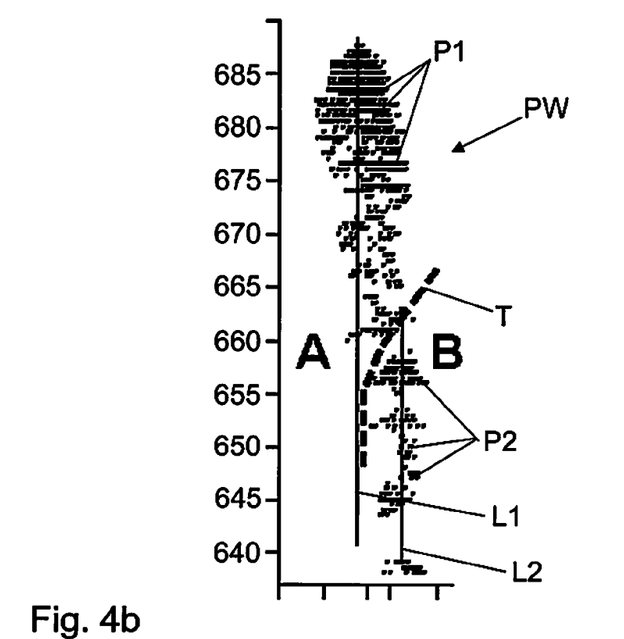
Figure 4C:
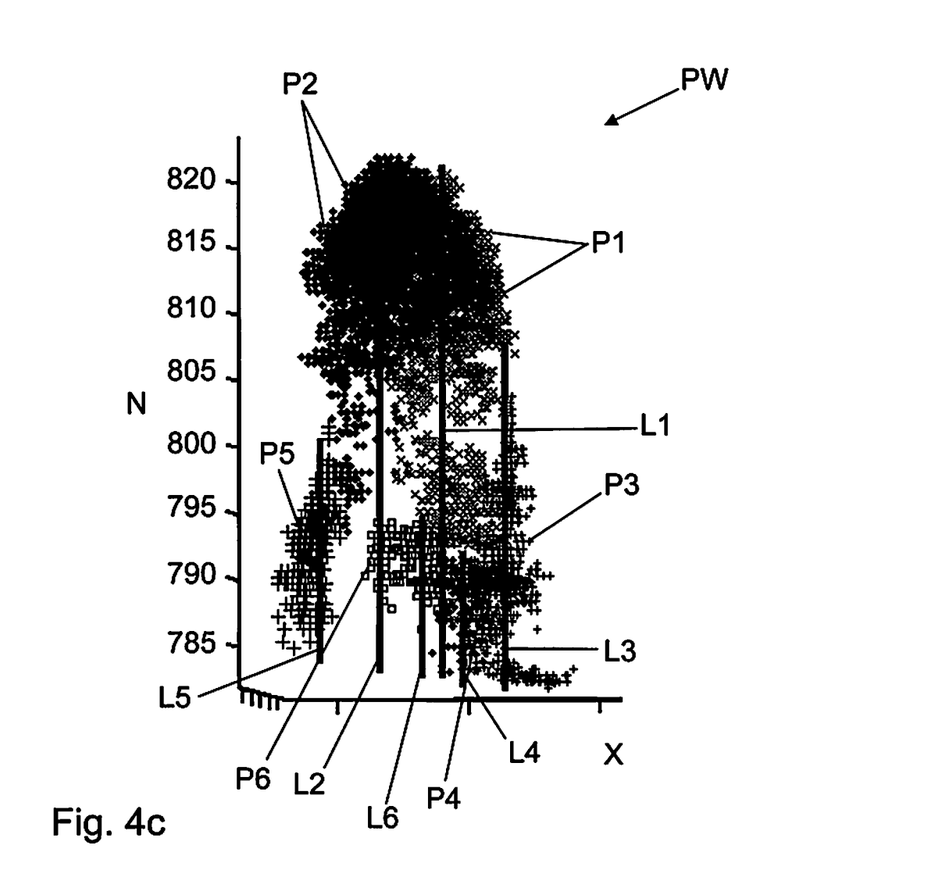

FIGS. 4a to 4c show exemplary results of segmented trees. In this case a two-dimensional section of the three-dimensional spatial co-ordinate system is shown in each case, with a height N being shown over the height axis (z axis in the co-ordinate system). The abscissa represents for example the x axis in the defined co-ordinate system (cf. for example FIG. 2). In FIG. 4a, a fictitious separating line T is drawn in, which delimits the segments A and B and the respectively allocated points P1, P2 from each other. The separating line T has been determined in this case by minimizing the global cost function E. Furthermore, two auxiliary lines L1, L2 are drawn in, with the auxiliary line L1 representing a tree trunk of the segment A and the auxiliary line L2 representing a tree trunk of the segment B. The auxiliary lines L1, L2 have been determined for verification of the method by inspecting the wood section being studied.

In a corresponding manner FIG. 4b illustrates two segments A, B with a respective tree. In this case the trees have a different height, which can be determined by the three-dimensional segmentation of the method according to the invention. The auxiliary lines L1, L2 in turn represent tree trunks and are used to verify the success of the segmentation which has been carried out.

In FIG. 4c, a number of six trees has been determined as the result of the segmentation, which are represented visually by the differently colored points P1, P6. The tree trunks represented by auxiliary lines L1 to L6 are again shown for the purpose of verification in a similar manner to the diagram of the preceding exemplary embodiments in FIGS. 4a and 4b. The position and height of the tree trunks has been determined by inspecting the wood section being studied.

As can be seen from these exemplary embodiments, underlying trees which were concealed/invisible for the previous methods of segmentation can also be successfully segmented and identified with the method according to the invention.

The information determined by the method according to the invention can be used not only for quantitative purposes, but also as a basis for three-dimensional diagrams of tree groups. For example, two-dimensional, colored maps of wooded areas with certain properties can be created on the basis of the information.

The method makes it possible to count trees in a wooded area. The size distribution and the local distribution of the trees can be determined. Furthermore, a classification of the trees into different tree species could take place. It is likewise possible to determine the quantity of wood using the number and the volume of the tree species.

If the method according to the invention is repeated at regular intervals, the chronological development of a wood can be carried out by comparing a plurality of evaluations from different times.

The segmentation of the trees does not necessarily have to take place in a wooded area. Tree recognition can likewise be carried out in urban areas, by means of which trees can be distinguished from houses.

The method according to the invention is likewise suitable for recording and segmenting trees in orchards or bushes in agricultural areas.

Furthermore, recording of houses in urban areas or hail distribution in clouds for the purpose of storm prediction can be realized with the method.

The method, apparatus and computer code of the present invention may be performed by a computer program. The computer program can exist in a variety of forms both active and inactive. For example, the computer program can exist as software possessing program instructions or statements in source code, object code, executable code or other formats; firmware program(s); or hardware description language (HDL) files. Any of the above can be embodied on a computer readable medium, which include storage devices and signals, in compressed or uncompressed form. Such computer readable storage devices include conventional computer RAM (random access memory), ROM (read only memory), EPROM (erasable, programmable ROM), EEPROM (electrically erasable, programmable ROM), and magnetic or optical disks or tapes. Computer readable signals, whether modulated using a carrier or not, can include heartbeat data packages, error data packages, test data packages and the like, all described above. It will be understood by those skilled in the art that a computer system hosting or running the computer program can be configured to access a variety of signals, including but not limited to signals downloaded through the Internet or other networks. Such may include distribution of executable software program(s) over a network, distribution of computer programs on a CD ROM or via Internet download and the like.

Reference throughout this specification to "one embodiment," "an embodiment," "a preferred embodiment," "alternate embodiment" or similar language means that a particular feature, structure, or characteristic described in connection with the embodiment is included in at least one embodiment of the present invention. Thus, appearances of the phrases "in one embodiment," "in an embodiment," "in a preferred embodiment," "in an alternate embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

While the present invention has been described in connection with certain exemplary, alternate or specific embodiments, it is to be understood that the invention is not limited to the disclosed embodiments, but, on the contrary, is intended to cover various modifications, alternatives, modifications and equivalent arrangements as will be apparent to those skilled in the art. Any such changes, modifications, alternatives, modifications, equivalents and the like may be made without departing from the spirit and scope of the invention.

The invention claimed is:

1. A method for computer-aided segmentation of an environment into individual objects, in particular of a wood into individual trees, in which
signals (SIG_R) which are backscattered by the objects are recorded by measurement technology, with the backscattered signals (SIG_R) resulting from the irradiation of the environment to be segmented with electromagnetic radiation;
spatial co-ordinates (x, y, z) of points which cause the backscattering and represent the object parts (X.sub.1, X.sub.2, . . . , X.sub.5) are determined from the backscattered signals (SIG_R), and a feature vector (f) is assigned to each of the points (P; P1, P2), which feature vector comprises at least the spatial co-ordinates (x, y, z) of the point in question (P; P1, P2);
a distance measure (d) is determined for each of the feature vectors (f), which represents a similarity between the feature vectors (f) of two points (P; P1, P2); and
the feature vectors (f) assigned to the points (P; P1, P2) are allocated to disjoint segments (A, B) in such a manner that a cost function (E) which takes into account the distance measures (d) of all the feature vectors (f) to each other is minimized, as a result of which the segmentation of the environment into individual objects is provided
wherein the distance measure (d) is determined by combining at least two distance measures (F, X, Z, G) which are weighted using a respective parameter and differ from each other, wherein the differing distance measures (F, X, Y, Z) assess similarities and distances in at least one point-related feature and spatial distances of the points, in particular in the x and y directions as well as in the z direction, differently;
wherein the point-related feature is determined from the temporal profile of the energy of the backscattered signal and either the uniformity of distribution or concentration of the points is used in the distance measure.

2. The method according to claim 1, in which the electromagnetic radiation is generated by coherent laser beams.

3. The method according to claim 2, in which the electromagnetic radiation is generated by a full waveform laser scanner, wherein complete recording of a respective full waveform signal which is backscattered by the points (P; P1, P2) takes place, from which signal at least the co-ordinates (x, y, z) of a respective point (P; P1, P2) are determined.

4. The method according to claim 3, in which the full waveform signal is decomposed into a series of Gaussian functions in order to determine the backscattered points (P; P1, P2).

5. The method according to claim 4, in which at least one further point-related feature (W, I) is determined for each point from the temporal profile of the energy of the backscattered signal (SIG_R), which feature is added to the allocated feature vector (d).

6. The method according to claim 5, in which the intensity (I) and/or the width (W) of a signal pulses which is allocated to a point (P; P1, P2) is determined as the at least one further point-related feature.

7. The method according to claim 1, in which the distance measure (d) is determined by the application of a norm to the feature vectors (f) of two points (P; P1, P2).

8. The method according to claim 1, in which a clustering method is used for minimizing the global cost function.

9. The method according to claim 1, in which a graph-based method is used for minimizing the global cost function, in which a graph consisting of the points as nodes and the distance measures (d) between the points (P; P1, P2) as edges is formed.

10. The method according to claim 9, in which the graph-based NCut measure is used, wherein the cost function is minimized by the Normalized-Cut method.

11. The method according to claim 9, in which the cost function is minimized by means of a graph cut method, wherein a flux between two segments to be formed is maximized and the flux represents the sum of all the edges between nodes of the two subgraphs to the defined.

12. The method according to claim 1, in which the number of the resulting segments is defined by means of one or a plurality of parameters.

13. The method according to claim 1, in which the environment is divided into a predefined spatial grid of voxels and the points (P; P1, P2) are in each case assigned to one of the voxels, wherein points which lie in the same voxel are combined.

14. The method according to claim 1, in which for at least some of the points (P; P1, P2) at least one further feature is added to the respective feature vectors (f) as a measure which is calculated from the point-related features (W, I) of other points (P; P1, P2) from a local neighborhood.

15. The method according to claim 14, in which the measure is defined locally for each of the points (P; P1, P2) by a core-based spatial filtering over all the points (P; P1, P2).

16. The method according to claim 14, in which known knowledge about the objects is added as further information to the feature vectors and is taken into account by means of a further distance measure.

17. The method according to claim 15, in which known knowledge about the objects is added as further information to the feature vectors and is taken into account by means of a further distance measure.

18. The method according to claim 1, in which trees in a wood are segmented as the objects, wherein positions of tree trunks are determined by defining vertical lines in the set of points (P; P1, P2).

19. A computer program product comprising a non-transitory computer usable medium having computer usable program code for computer-aided segmentation of an environment into individual objects, said computer program product in which:
- signals (SIG_R) which are backscattered by the objects are recorded by measurement technology, with the backscattered signals (SIG_R) resulting from the irradiation of the environment to be segmented with electromagnetic radiation;
- spatial co-ordinates (x, y, z) of points which cause the backscattering and represent the object parts ($X.sub.1$, $X.sub.2$, . . . , $X.sub.5$) are determined from the backscattered signals (SIG_R), and a feature vector (f) is assigned to each of the points (P; P1, P2), which feature vector comprises at least the spatial co-ordinates (x, y, z) of the point in question (P; P1, P2);
- a distance measure (d) is determined for each of the feature vectors (f), which represents a similarity between the feature vectors (f) of two points (P; P1, P2); and
- the feature vectors (f) assigned to the points (P; P1, P2) are allocated to disjoint segments (A, B) in such a manner that a cost function (E) which takes into account the distance measures (d) of all the feature vectors (f) to each other is minimized, as a result of which the segmentation of the environment into individual objects is provided
- wherein the distance measure (d) is determined by combining at least two distance measures (F, X, Z, G) which are weighted using a respective parameter and differ from each other, wherein the differing distance measures (F, X, Y, Z) assess similarities and distances in at least one point-related feature and spatial distances of the points, in particular in the x and y directions as well as in the z direction, differently;
- wherein the point-related feature is determined from the temporal profile of the energy of the backscattered signal and either the uniformity of distribution or concentration of the points is used in the distance measure.

20. A device for computer-aided segmentation of an environment into individual objects, in particular of a wood into individual trees, comprising:
- a first means for recording signals (SIG_R) which are backscattered by the objects are recorded by measurement technology, with the backscattered signals (SIG_R) resulting from the irradiation of the environment to be segmented with electromagnetic radiation;
- a second means for determining spatial co-ordinates (x, y, z) of points which cause the backscattering and represent the object parts ($X.sub.1$, $X.sub.2$, . . . , $X.sub.5$) are determined from the backscattered signals (SIG_R), and a feature vector (f) is assigned to each of the points (P; P1, P2), which feature vector comprises at least the spatial co-ordinates (x, y, z) of the point in question (P; P1, P2);
- a third means for determining a distance measure (d) is determined for each of the feature vectors (f), which represents a similarity between the feature vectors (f) of two points (P; P1, P2); and
- a fourth means for allocating the feature vectors (f) assigned to the points (P; P1, P2) are allocated to disjoint segments (A, B) in such a manner that a cost function (E) which takes into account the distance measures (d) of all the feature vectors (f) to each other is minimized, as a result of which the segmentation of the environment into individual objects is provided
- wherein the distance measure (d) is determined by combining at least two distance measures (F, X, Z, G) which are weighted using a respective parameter and differ from each other, wherein the differing distance measures (F, X, Y, Z) assess similarities and distances in at least one point-related feature and spatial distances of the points, in particular in the x and y directions as well as in the z direction, differently;
- wherein the point-related feature is determined from the temporal profile of the energy of the backscattered signal and either the uniformity of distribution or concentration of the points is used in the distance measure.

* * * * *

UNITED STATES PATENT AND TRADEMARK OFFICE
CERTIFICATE OF CORRECTION

PATENT NO.        : 8,559,680 B2
APPLICATION NO.   : 12/935791
DATED             : October 15, 2013
INVENTOR(S)       : Schnoor et al.

Page 1 of 1

It is certified that error appears in the above-identified patent and that said Letters Patent is hereby corrected as shown below:

In the Specifications:

In column 12, line 23, delete "P1, P6" and insert --P1, ..., P6--.

In the Claims:

In column 13, claim 1, lines 55-56, delete "X.sub.1, X.sub.2, ..., X.sub.5" and insert --($X_1, X_2, ..., X_5$)--.

In column 15, claim 19, lines 27-28, delete "X.sub.1, X.sub.2, ..., X.sub.5" and insert --($X_1, X_2, ..., X_5$)--.

In column 16, claim 20, line 18, delete "X.sub.1, X.sub.2, ..., X.sub.5" and insert --($X_1, X_2, ..., X_5$)--.

Signed and Sealed this
Sixth Day of May, 2014

Michelle K. Lee
*Deputy Director of the United States Patent and Trademark Office*